United States Patent [19]

Défago et al.

[11] 4,033,716

[45] July 5, 1977

[54] TRANSFER PRINTING PROCESS FOR HYDROPHILIC FIBROUS MATERIAL

[75] Inventors: Raymond Défago, Riehen; Visvanathan Ramanathan, Basel, both of Switzerland; Gerhard Back, Lorrach, Germany

[73] Assignee: Ciba-Geigy AG, Basel, Switzerland

[22] Filed: Oct. 15, 1974

[21] Appl. No.: 515,104

[30] Foreign Application Priority Data

Nov. 2, 1973 Switzerland ............ 15456

[52] U.S. Cl. ............ 8/2.5 A; 8/41 R; 8/31; 8/17; 8/1 F; 8/1 T
[51] Int. Cl.² ............ D06P 1/10; D06P 1/12
[58] Field of Search ............ 8/2.5, 41 R, 31, 17, 8/1.2

[56] References Cited

UNITED STATES PATENTS

| 1,993,524 | 3/1935 | Pöschel | 41/33 |
|---|---|---|---|
| 2,911,280 | 11/1959 | Cicogna | 8/2.5 |
| 3,046,079 | 7/1962 | Reeves | 8/115.6 B |
| 3,101,276 | 8/1963 | Hendricks | 8/115.6 B |
| 3,434,794 | 3/1969 | Tovey | 8/115.6 B |
| 3,829,286 | 8/1974 | Anzai et al. | 8/2.5 |

FOREIGN PATENTS OR APPLICATIONS

| 1,211,149 | 11/1970 | United Kingdom | 8/2.5 UX |
| 1,189,026 | 4/1970 | United Kingdom | 8/2.5 |
| 1,320,819 | 4/1970 | United Kingdom | 8/2.5 |

OTHER PUBLICATIONS

Porter, Textile Research Journal 2/1965, pp. 159–167.
Ott et al., Cellulose & Cellulose Derivatives, Part I, pp. 272–273 & Part III, pp. 1076–1080, Pub. by Interscience Pub. N.Y.C., 1955.

*Primary Examiner*—Donald Levy
*Attorney, Agent, or Firm*—Wenderoth, Lind & Ponack

[57] ABSTRACT

A process for dyeing and printing hydrophilic fibrous material by the transfer printing process using carriers that are treated with at least one transferable, metallizable dye or color former and optionally a binder that is stable below 230° C, which comprises impregnating the material to be dyed or printed with a solution which contains a. at least one organic solvent with a boiling point higher than 100° C and b. at least one compound that yields complex forming metals, drying the impregnated material and bringing it into contact with the treated carrier, then subjecting both material and carrier to a heat treatment, and subsequently providing the resultant print with an aftertreatment.

16 Claims, No Drawings

TRANSFER PRINTING PROCESS FOR HYDROPHILIC FIBROUS MATERIAL

It is known to produce prints on woven or knitted textile fabrics by printing a carrier, usually paper, with an aqueous or preferably an organic, virtually anhydrous printing ink prepared from a sublimable disperse dye that is sparingly soluble in water, then pressing the printed paper and the fabric together at a temperature at which the dye sublimes. The dye is transferred to the fabric, and diffuses into the fibres. Using this transfer printing process, it is possible to produce solid shade dyeing effects as well as complicated patterns without the necessity of having to use expensive printing machines in this stage.

Appropriate processes are described, for example, in French Pat. Nos. 1,223,330 and 1,334,829 as well as in Swiss Pat. No. 476,893. However, all these processes relate to the printing of hydrophobic synthetic fibres, such as cellulose acetate, synthetic polyamides, acrylonitrile, and, especially, polyesters. Since the sublimable dyes used hitherto for the transfer printing have no, or at least little, affinity for hydrophilic cotton and regenerated cellulose fibres, only useless prints of poor colour strength are obtained on these materials by the transfer printing process.

Swiss Pat. No. 541,022 describes a transfer printing process that has for its object the printing of textile and nontextile structures using organic, sublimable dyes that form metal complexes, the metal donors being contained in the substrate to be printed. This process too still gives unsatisfactory results on hydrophilic fibres: for example, only dyeings of poor colour strength are obtained on cellulose fibres.

A method of dyeing and printing hydrophilic fibrous material, in particular cellulose and polyhydroxylated synthetic fibrous materials, has now been found that makes it possible to dye or print also hydrophilic fibrous material by the transfer printing process in strong shades that are fast to wet treatments and light. The novel process consists in using on the one hand carriers that are treated with at least one transferable, metallisable dye or colour former and optionally with a binder that is stable below 230° C, and on the other hand impregnating the material to be dyed or printed with a solution which contains
  a. at least one organic solvent with a boiling point higher than 100° C, and
  b. at least one compound that yields complex forming metals, drying the impregnated material and bringing it into contact with the treated carrier, then subjecting both material and carrier to a heat treatment, and subsequently providing the dyed or printed material with an optional aftertreatment.

As organic solvent with a boiling point higher than 100° C, there is used in the process according to the invention advantageously an organic compound that
  a. has a boiling point higher than 120° C,
  b. has a solubility in water of at least 25 g/l at 25° C directly or with the aid of an auxiliary solvent, and
  c. is sparingly volatile but fluid under the transfer conditions of the metallisable dyes or colour formers.

The organic compounds used in this process, together with the water, penetrate into the cellulose fibres, whereupon these swell. Since the organic compound has a higher boiling point than water, the latter can be removed without causing the swelling of the cellulose to disappear. The water can be removed by various methods, e.g. by drying with hot air or in a vacuum cabinet. However, the drying conditions must not be too severe, for the organic solvent may not be removed along with the water, at least not entirely. The natural moisture of the cellulose fibres (about 5 to 8% by weight in cotton) must also be retained.

The amount of organic compound in the impregnating solution necessary to attain an optimum uptake of dye depends on the composition of the material to be printed; about 100 to 200 g/l are preferably used for cotton.

The transfer of the dye is effected ordinarily between 120° C and 240° C. The solvent present in the hydrophilic fibre must be fluid or become fluid below this temperature range and during the transfer of the dye it may not volatilise or at most partially volatilise. Suitable compounds are those that contain one or preferably two or more of the following functional radicals: hydroxy, mercapto, alkylthio, alkoxy, epoxy, acyloxy, acylamino, ureido, keto, or amino groups. The alkoxy and acyloxy groups are preferably low molecular radicals, e.g. methoxy, ethoxy, acetate, propionate, butyrate, methylsulphonyloxy, methoxycarbonyl etc.

Such organic compounds are, for example, alcohols, especially polyhydric alcohols or aminoalcohols and the ethers and esters derived-therefrom. There may be cited as examples: 2,5-hexanediol, 1,6hexanediol, tetrahydrofurfuryl alcohol, isopropylethanolamine.

Particularly suitable are the glycols and glycol derivatives of the formula $$R_1-O-CH(R)-CH_2-R_2$$

wherein R is H, CH$_3$; R$_1$ is H, alkyl with 1 to 4 carbon atoms, benzyl, phenylethyl,

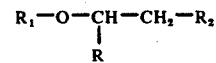

in which R' is alkyl with 1 to 4 carbon atoms, cycloalkyl with 5 to 6 carbon atoms, benzyl, phenylethyl or phenyl, and R$_2$ is OH, OR', —SR', —NHR', N,N-dialkylamino with 1 to 4 carbon atoms, N,N-dibenzylamino,

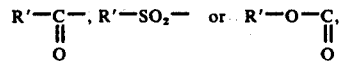

As examples there may be cited: ethylene glycol, ethylene glycol monomethyl ether, ethylene glycol monoethyl ether, diethylene glycol, thiodiethylene glycol, diethylene glycol diacetate, methoxydiethylene glycol acetate, β-phenoxyethanol, triethylene glycol and polyethylene glycol with a molecular weight of under 600; polypropylene glycols and compounds that contain both ethylene glycol and propylene glycol units.

Suitable organic solvents are also the reaction products of alkylene oxides with phenols, thiophenols, arylamines and arylsulphonic acids. Such products are obtained by reacting e.g. about 10 moles of ethylene oxide with 1 mole of phenol, aniline, thiophenol or sodium-p-toluenesulphanate. Also suitable are reaction products of alkylene oxides (ethylene oxide or propylene oxide) with polyols, e.g. glycerol, sorbitol, pentaerythritol or trimethylolpropane, in particular those with molecular weights of about 500 to 600, in which case some of the hydroxyl groups, preferably about half, are subsequently etherified.

A further group of preferred organic compounds are those that contain a group of the formula

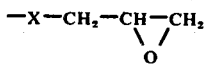

wherein X represents an oxygen atom or a —NH or —N—$C_1$—$C_4$ alkyl group. Such compounds are obtained by reaction of products containing OH or —NH groups with epichlorohydrin. Examples are: diglycidyl ethers of alkanediols with 1 to 8 carbon atoms, e.g. 1,4-butanediol diglycidyl ether, 1,3-propanediol diglycidyl ether; triglycidiylisocyanurate; diglycidylamides of heterocycles containing NH groups, such as propylene urea or hydantoins.

A further interesting group of organic solvents that can be used according to the invention consists of ureas and melamines whose nitrogen atoms are substituted by low molecular alkyl, hydroxyalkyl, cyanoalkyl or alkoxyalkyl groups. The term "urea" also comprises in this connection thiourea and cyclic ureas. e.g.

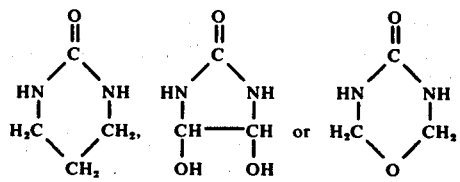

Examples of such compounds are: N,N-dimethyl urea, dimethylol ethylenethiourea, pentamethylol melamine-trimethyl ether, dimethylol dihydroxyethylene urea, dimethylene ethylene urea, hexamethylol melamine tetramethyl ether, dimethylol urea-monomethyl ether and

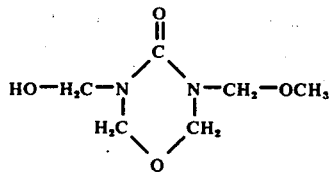

Mixtures of these compounds also yield good results. Useful too are compounds of the formula $R_1 — Z — R_2$ wherein Z represents an oxygen or a sulphur atom or a group

and each % $R_1$, $R_2$ and $R_3$ independently represents low molecular, optionally substituted alkyl radicals at least one of which is substituted by a hydroxy group.

Other organic compounds that are suitable for the pretreatment according to the invention are phosphoric acid triamides the nitrogen atoms of which carry lower alkyl groups, e.g. hexamethylphosphoric acid triamide, and aliphatic or mixed aliphatic-aromatic phosphonic and phosphoric acid, ester, e.g.

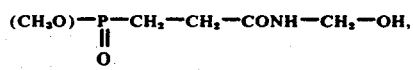

also lactones and lactams, e.g. butyrolactone and ε-caprolactam.

Suitable complex forming metals are all divalent and polyvalent metals of Groups I to VIII of the Periodic System, in particular Al, Co, Cr.Cu, Fe, Mg, Mn, Mo, Ni, Sn, Ti, V, W, Zn, Sb, but also Au and the monovalent Ag. Of these metals, for example, nickel, copper, chromium and cobalt are of particular importance.

The metal compounds can be in the form of inorganic or organic salts or in some other suitable form, while the specific nature of the metal compounds can be different depending on the substrate. Cotton and wool fabric are impregnated, for example, with metal mordants such as are conventionally used in dyeing with mordant dyes, e.g. wool with $CuSO_4$/acetic acid or sodium bichromate/acetic acid, and cotton with e.g. nickel or copper acetate.

The amount of the metal salts in the impregnating solution depends on the nature of the complex formation with the dye or colour former. It must be so chosen that the desired mono- or double-complex salts are able to form. It is possible to use 1 to 100g of metal salt per liter of impregnating solution. It is advantageous to use 2 to 15 g of metal salt per liter.

Suitable complex forming dyes or colour formers are compounds of the most diverse chemical classes, e.g. hydroxyanthraquinones, hydroxynaphthoquinones, o-hydroxynitroso compounds and preferably metallisable azo dyes. Among the metallisable azo dyes there may be mentioned:

a. o-hydroxyazo dyes which during the metallising form structures of the type

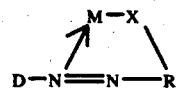

wherein D is the radical of a diazotisation component, R is the radical of a coupling component, M is a metal equivalent and X is O or NU, b. dyes that each have one complex forming substituent on both sides of the azo group, i.e. that contain the group of the formula

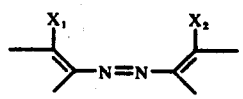

wherein each of $X_1$ and $X_2$ independently represents groups of the formulae —OH, OR, SR. —$NH_2$, —NHE and —COOH, in which R represents an alkyl radical, c. dyes that contain groups of the formulae

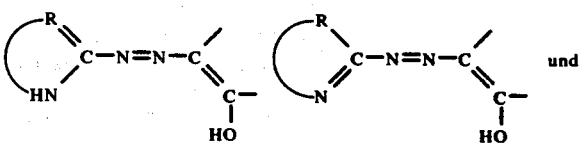
und

-continued

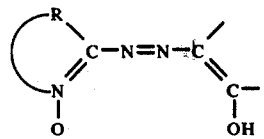

wherein R represents in each case a group that completes a ring of 5 or 6 members, e.g. the dyes of the following types:

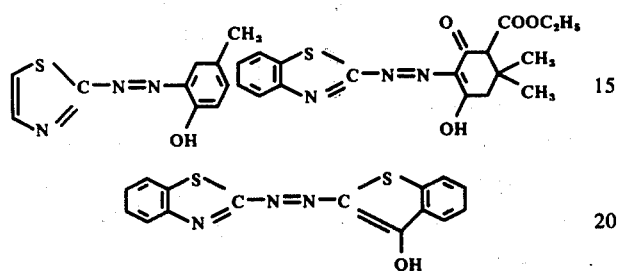

and finally, metallisable azo dyes that form complexes with participation of the azo bridge and correspond e.g. to the following types:

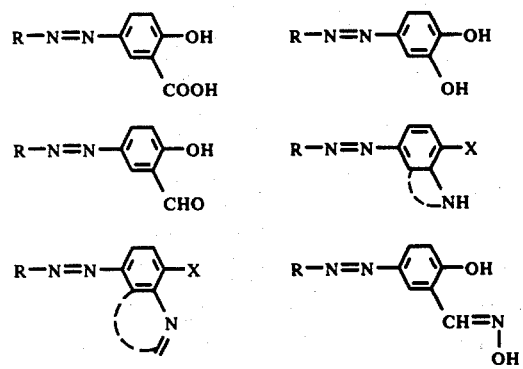

wherein R represents the radical of a diazo component and X represents —OH, —NH₂ or —NHR'.
Also suitable are dyes with heterocyclic coupling components, e.g.

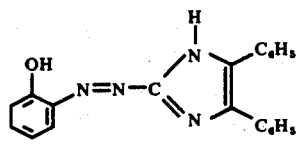

or dyes that yield tricyclic or pentacyclic metal complexes, e.g.

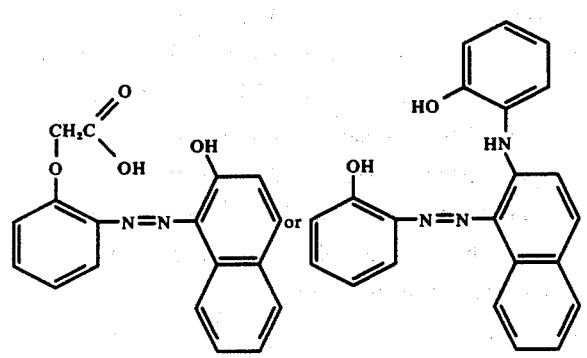

-continued

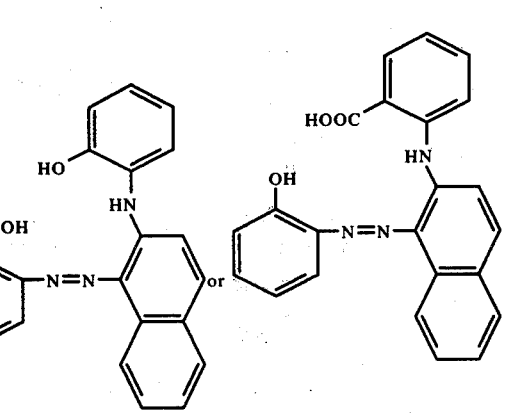

e.g.

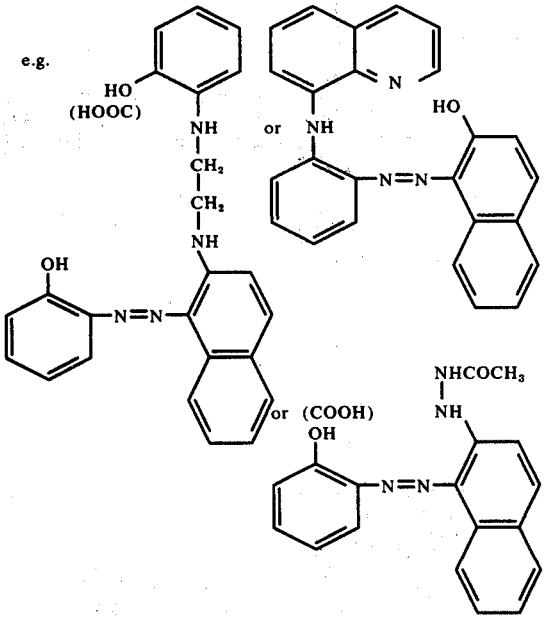

It is also possible to use metallisable azomethine dyes, e.g.

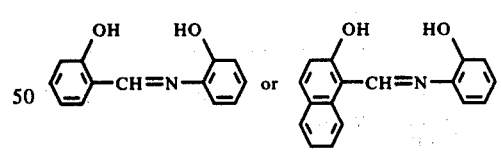

and azomethines from o-oxaldehydes and the above cited heterocyclic diazo components, e.g.

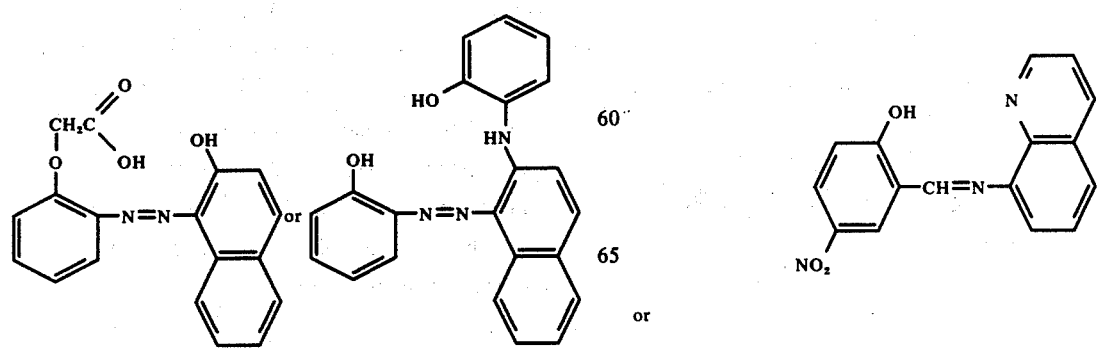

or

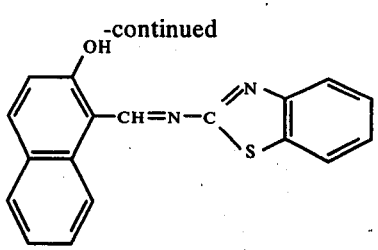

Also suitable are 1,5-diarylformazanes which are substituted in ortho-position by OH or COOH groups of the type

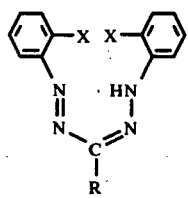

wherein X is —OH, —COOH (one X can be hydrogen), R is —H, aryl, alkyl, —CN, acyl, halogen, —NO$_2$, or formazyls which are derived from heterocyclic diazo components, e.g.

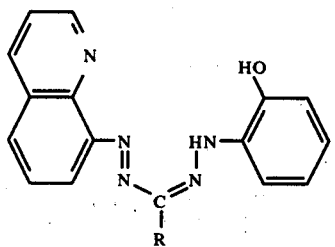

Also suitable are azomethine analogues of formazyl compounds of the type

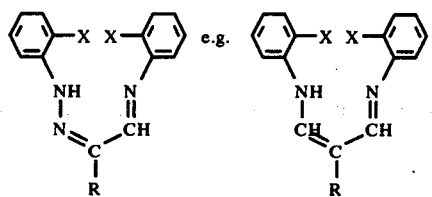

wherein X and R have the meanings assigned to them hereinabove.

It is also possible to use the reaction products of suitable aldehydes and amines, e.g.
glyoxal-bis-(2-hydroxy)-anil

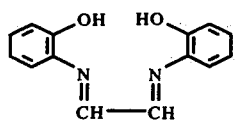

and also Schiff bases from o-hydroxyaldehydes and diamines, e.g.

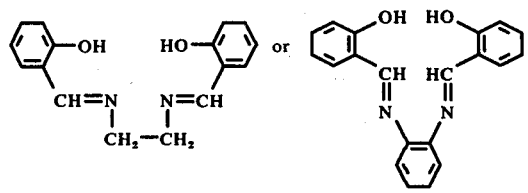

and condensation products of o-aminoaldehydes and diamines, e.g.

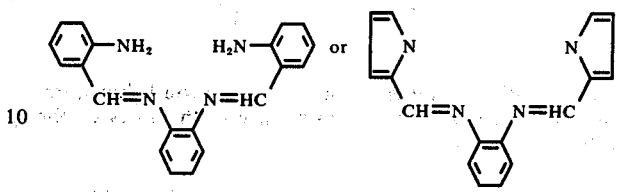

Finally, as complex forming dyes or colour formers mention is also to be made of those that yield tetracyclic metal complexes, principally of copper and nickel, e.g. diacetyl dioxime, condensation products of acetone and ethylene diamine or triethylene tetramine, tetracondensation products of 2-aminobenzaldehyde and, in particular, primary products of tetrabenzoporphines and tetraazatetrabenzoporphines, e.g.

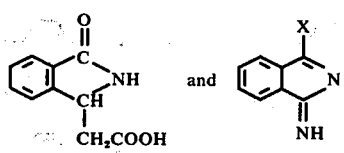

wherein X is —O—alkyl, —SR, —NH$_2$.

As hydroxyanthraquinones there may be mentioned, inter alia, 1-hydroxy-anthraquinone, 1,2-dihydroxy-anthraquinone, 1,4-dihydroxy-anthraquinone, 1,2-dihydroxy-3-nitro-anthraquinone, 1,8-dihydroxy-anthraquinone, 1,2,5-trihydroxyanthraquinone, 1,4-dihydroxy-naphthoquinone and 8-hydroxy-1,4-naphthoquinone, as well as

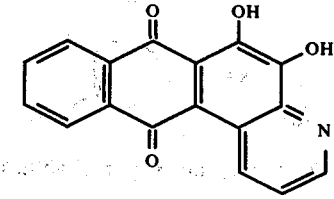

As o-hydroxy-nitroso compounds there may be mentioned: 1,3-dinitroso-2,4-dihydroxybenzene, 2-nitroso-4-tert. amylphenol, 1-nitroso-2-hydroxynaphthalene, 2-nitroso-1-hydroxynapththalene-6-sulphonic acid amide or dialkylamide, 1-nitroso-2-hydroxy-3-(γ-dimethylaminopropylamino-carbonyl)-naphthalene and 6-nitroso-7-hydroxyindazole. Mention is further to be made of metallisable oxazine and thiazine compounds, e.g.

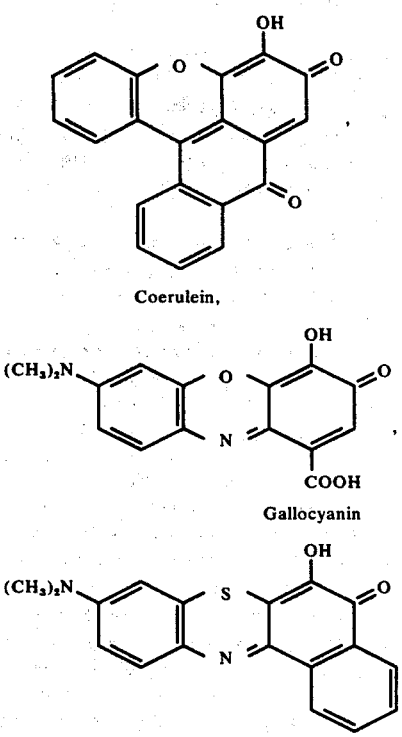

Coerulein,

Gallocyanin

As examples there may be cited the dyes C.I. 14025, C.I. 14130 and C.I. 26520 of the Colour Index.

Preferably, the transferable, metallisable dyes or colour formers to be used according to the invention for the transfer printing, the manufacture of the carriers, the printing inks and the dyestuff preparations, contain at most one sulphonic acid group, but preferably contain no such groups.

Transferable dyes that can be used according to the invention are those which effect a tinctorially sufficient staining (dyeing) in compliance with the "Process for determining the fastness to heat setting and pleasting of dyeings and prints (dry heat)" of the Swiss Standards Association, SNV 95 8 33/1961. In this Swiss Standard Specification, SNV 95 8 33/1961, a sample of the dyed material is heated in intimate contact with an undyed material for which the dye has good affinity according to conventional dyeing methods under a pressure of 40 g ± 10 g per cm² over 30 seconds at specific test temperatures.

In selecting the dyes suitable for the process according to the invention, a printed or dyed auxilliary substrate, e.g. paper, is used instead of the dyed material.

The dyes that are capable of complex formation, i.e. in the metal-free form. The temperature is dependent on the thermal stability or on the fluidity of the substrate to be printed in the transfer process. For printing cotton and wool, for example, the process is therefore carried out at temperatures between about 160° C and 200° C. Depending on the substrate, the process is also carried out at temperatures lower than 80° C or higher than 220° C when merely a tinctorially adequate staining (dyeing) is produced on the substrate in contact with the dye on the carrier.

According to the invention, dyes are also used which stain (dye) the undyed substrate sufficiently after a heating time of less than 30 seconds and of up to 2 minutes and/or both at lower and at higher contact pressure than that specified in the standard specification. It is immaterial whether the dye sublimes in the physical sense or penetrates into the substrate in a state other than the gaseous state if it only transfers from the carrier to the substrate.

If, for example, the dyes which are compounds containing hydroxy groups are in the form of their alkali salts, these must be converted first into the active, transferable acid form. This can be accomplished with the aid of a compound that gives acid reaction, e.g. sulphamic acid.

Suitable hydrophilic fibrous materials are principally woven and knitted fabrics but also nonwovens of polyhydroxylated natural or synthetic fibrous materials, e.g. staple fibre, cotton and viscose, polyvinyl alcohol fibres and mixtures thereof with synthetic fibres, e.g. polyacrylonitrile and especially polyester.

The hydrophilic fibrous material to be dyed according to the present invention is advantageously impregnated with an aqueous or aqueous-organic solution of at least one organic solvent having a boiling point higher than 100° C and at least one compound that yields complex forming metals which can contain additional assistants, e.g. wetting agents, if desired squeezed out and then dried, for example by being left to stand in the air or warmed to 80° C to 100° C.

The inert intermediate or auxiliary carrier required for the dry heat transfer, i.e. a carrier for which the used metallisable dyes or colour formers according to the invention have no affinity, is advantageously a flexible, preferably stable sheet material, such as a ribbon, strip, or a foil with appropriately smooth surface, which is stable to heat and can consist of the most varied kinds of material, above all non-textile material, e.g. metal, such as a steel or an aluminium foil, or an endless ribbon of stainless steel plastic or paper, preferably pure non-lacquered cellulose parchment paper which can optionally be coated with a film of vinyl resin, ethyl cellulose, polyurethane resin, or teflon.

The printing inks used according to the invention contain in addition to the dye or colour former capable of metal complex formation as defined herein, if necessary, also at least one binder that is stable below 230° C and acts as thickener for the printing batch and as at least temporary binder of the dyestuff on the carrier to be printed. Suitable as such binders are synthetic, semi-synthetic, and natural resins, i.e. both polymerisation and polycondensation and polyaddition products. In principle, it is possible to use all resins and binders customarily used in the printing ink and paint industry. The binders should not melt at the transfer temperature, react chemically in the air or with themselves (e.g. cross-link), have little or no affinity for the dyes or colour formers used, solely maintain the metallisable dyes at the printed area of the inert carrier without changing them, and remain on the carrier in their entirety after the heat transfer process. Preferred binders are those that are soluble in organic solvents and that dry rapidly for example in a warm current of air and form a fine on the carrier. Suitable water-soluble binders are- alginate, tragacanth, carubin (from locust bean gum), dextrin, more or less etherified or esterified mucilages, hydroxyethyl cellulose or carboxymethyl cellulose, water-soluble polyacrylic amides or, above all, polyvinyl alcohol: and suitable binders that are soluble in organic solvents are cellulose esters, such as nitrocellulose acetate or butyrate, and, in particular, cellulose ethers, such as methyl, ethyl, propyl, isopropyl, benzyl, hydroxypropyl, or cyanoethyl cellulose, as also mixtures thereof.

When using dispersions, the dye salts dispersed in the printing ink must have principally a particle size of 10μ, preferably 2μ.

Besides water, practically all water-miscible and water-immiscible organic solvents or solvent mixtures are suitable which boil at atmospheric pressure at temperatures below 220° C, preferably below 150° C, and which have sufficient solubility or emulsifiability (dispersibility) for the dyes and binders used. The following may be cited as examples of suitable organic solvents: aliphatic and aromatic hydrocarbons, e.g. n-heptane, cyclohexane, petroleum ether, benzene, xylene or toluene, halogenated hydrocarbons, such as methylene chloride, trichloroethylene, perchloroethylene or chlorobenzene, nitrated aliphatic hydrocarbons, such as nitropropane, aliphatic amides, such as dimethyl formamide or mixtures thereof, also glycols, such as ethylene glycol or ethylene glycol monoalkyl ethers, e.g. ethylene glycol monoethyl ether, diethyl carbonate, dimethyl carbonate, or esters of aliphatic monocarboxylic acids, e.g. ethyl acetate, propyl acetate, butyl acetate, β-ethoxyethyl acetate, aliphatic or cycloaliphatic ketones, for example methyl ethyl ketone, methyl isobutyl ketone, cyclohexanone, isophoron, mesityl oxide, or diacetone alcohol and alcohols, e.g. methanol, ethanol, and, preferably, n-propanol, isopropanol, n-butanol, tert.butanol, sec.butanol, or benzyl alcohol; also suitable are mixtures of the cited solvents, e.g. a mixture of methyl ethyl ketone and ethanol in the ratio 1:1.

Particularly preferred solvents are esters, ketones, or alcohols which boil below 120° C., e.g. butyl acetate, acetone, methyl ethyl ketone, ethanol, isopropanol, or butanol. Virtually anhydrous printing inks are used with advantage.

The desired viscosity of the printing inks can be adjusted by addition of the cited binders, or by dilution with water or a suitable solvent.

The process according to the invention can be carried out, for example, in the following manner: printing inks which contain at least one dye or colour former that is capable of metal complex formation and is transferable, optionally a binder which is stable below 230° C, water and/or an organic solvent, are applied to an inert carrier and dried. The treated side of the carrier is then brought into contact with the surface of the previously treated hydrophilic material to be dyed and carrier and material are subjected to a heat treatment of 120° C to 210° C, optionally under mechanical pressure, over the course of 5 to 60 seconds, advantageously 10 to 40 seconds, and the dyed material is then removed from the carrier.

The liquid, pasty or dry dyeing preparations contain in general 0.01 to 80, preferably 1 to 30, percent by weight of at least one or more dyes or colour formers that are capable of metal complex formation and optionally 0.5 to 50 percent by weight of a binder, based on the total weight of the preparation, and can be used direct or after dilution as printing inks according to the invention.

The suitability of the printing inks can be improved by adding optional components, for example plasticisers, swelling agents, high boiling solvents such as e.g. tetralin or decalin, ionogenic or non-ionogenic surface active compounds, for example the condensation product of 1 mol of octylphenol with 8 to 10 mols of ethylene oxide.

The optionally filtered printing inks are applied to the inert carrier, for example by spraying, coating, or advantageously by printing the carrier on parts of the surface or over the entire surface. It is also possible to apply a multicoloured pattern or to print successively in a base shade and subsequently with similar or different patterns.

After the printing inks have been applied to the inert carrier, these are then dried, e.g. with the aid of a flow of warm air or by infrared irradiation, optionally with recovery of the solvent employed.

The intermediate carriers can also be printed on both sides, whereby it is possible to select dissimilar colours and/or patterns for both sides. In order to avoid using a printing machine, the printing inks can be sprayed on to the auxiliary carrier, for example, by using a spray gun. Particularly interesting effects are obtained if more than one shade is printed or sprayed on to the auxiliary carrier simultaneously. Futhermore, specific patterns can be obtained for example by using stencils or artistic patterns by using a brush. If the auxiliary carriers are printed, the most diverse forms of printing methods can be employed, for example relief printing (e.g. letter-press printing, flexographic printing), intaglio printing (e.g. roller printing), silkscreen printing (e.g. rotary screen printing, film screen printing) or electrostatic printing.

The transfer is performed in the conventional manner by the action of heat. The treated auxiliary carriers are brought into contact with the textile materials and kept at 120° C to 210° C until the metallisable dyes or colour formers applied to the auxiliary carrier are transferred to the textile material. As a rule 5 to 60 seconds suffice for this.

The heat can be applied in various known ways, e.g. by passage through a hot heater drum, a tunnel-shaped heating zone or by means of a heated cylinder, advantageously in the presence of an unheated or heated backing roll which exerts pressure, or of a hot calender, or also by means of a heated plate (iron or warm press), optionally in vacuo, the various devices being preheated by steam, oil, infrared irradation or microwaves to the required temperature or being located in a preheated heating chamber.

Upon completion of the heat treatment the printed goods are removed from the carrier.

Compared with known processes, the process according to the invention has notable advantages. It has in particular the principal advantage of the now largely solved problem of achieving deep, brilliant dyeings and prints which are fast to wet treatments and light on hydrophilic fibrous material while maintaining optimum mechanical fibre properties. The prints obtained by the new process are characterised by sharply dilineated, finely etched conours. They are more brilliant and faster than corresponding dyeings on hydrophilic material that has not been pretreated or that has been preheated without a solvent having a boiling point higher than 100° C.

The following Examples illustrate the invention but do not in any way limit the scope thereof. Parts and percentages are by weight.

EXAMPLE 1 a. With cooling, 5 parts of the metalisable dye of the formula

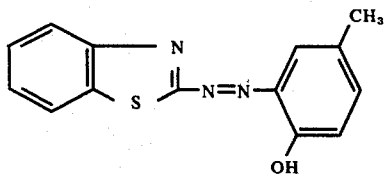

10 parts of ethyl cellulose (Ethocel E 7, Dow. Chem.), 42.5 parts of ethanol and 42.5 parts of methyl ethyl ketone are ground for 4 hours in a sand mill. After the sand has been separated from the grinding stock, there is obtained a printing ink with very good dispersion of the dye. The resultant printing ink is printed on paper to give a paper carrier suitable for the transfer printing process.

b. A cotton fabric is impregnated at room temperature with a liquor consisting of 200 parts of diethylene glycol, 10 parts of nickel acetate and 800 parts of water to a pick-up of about 70% and dried in the air overnight or at 80° C to 100° C.

c. On an ironing machine, the dye is transferred at 160° C over 30 seconds from the paper carrier obtained according to a) to the pretreated cotton fabric. The transferred dye forms a complex with the nickel and a strong, green print of good fastness to wet treatments and rubbing is obtained on the cotton fabric. The fastness properties are improved by subsequently soaping with 1 g/l of a non-ionogenic detergent and 5 ml/l of a 25% ammonia solution for 15 minutes at 80° C.

By carrying out the procedure as described in this Example, but using an impregnating liquor without diethylene glycol, only a useless print of poor colour strength is obtained on the cotton fabric.

EXAMPLE 2

A paper carrier is manufactured with the metallisable dye of the formula

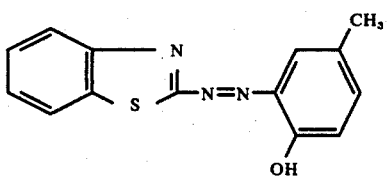

in analogous manner to Example 1a) and the cotton fabric is treated as in 1b), but with a liquor containing 200 parts of methoxypolyethylene glycol MG 430, 5 parts of nickel acetate and 795 parts of water. The transfer is carried out as in Example 1c) and the fabric is given a corresponding aftertreatment. A strong, green dyeing of very good fastness properties is obtained on the cotton fabric.

EXAMPLE 3 to 9

Very strong and fast prints are obtained by carrying out the procedure as described in Example 1a) using one of the dyes

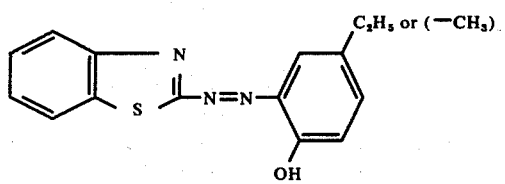

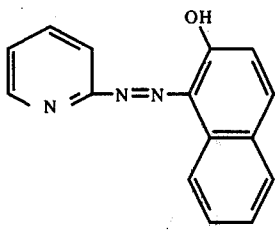

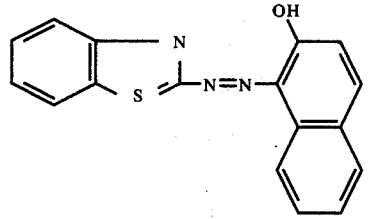

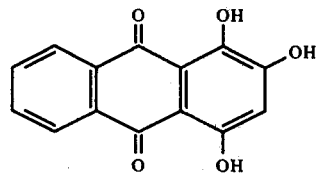

and treating a cotton fabric in analogous manner the Example 1b) with a liquor containing in addition to a metal salt one or a mixture of the following compounds

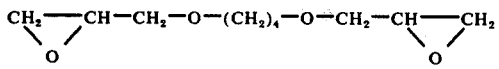

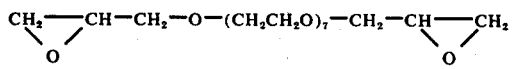

methoxypolyethylene glycol (mol. wt. 430), thiodiethylene glycol, 100 g/l of each of

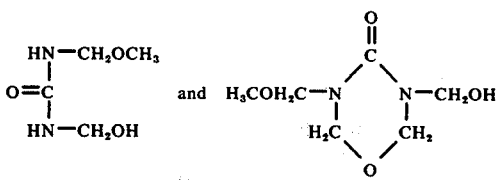

and carrying out the transfer as in Example 1c) over 30 seconds at temperatures between 160° C and 200° C, after which it is possible to carry out an aftertreatment as in 1c) or one of the following aftertreatments: with 0.1% aqueous sodium carbonate solution at 100° C over 5 minutes for anthraquinone dyes, with 0.1% non-ionogenic aqueous detergent solution in addition to 0.1% sodium carbonate over 20 minutes at 80° C to 100° C for azo dyes.

An aftertreatment in perchloroethylene over 10 minutes at 90° C increases the fastness to rubbing of the prints.

EXAMPLES 10 AND 11 a. With cooling, 20 parts of Phthalogen Brilliant Green IF3G (Bayer) or 20 parts of Phthalogen Brilliant Blue IF3G (Bayer), 5.6 parts of ethyl cellulose (Ethocel E 7, Dow Chem.) and 74.4 parts of ethanol are ground for 4 hours in a glass bead mill. After the glass beads have been separated from the grinding stock, there is obtained a a very finely dispersed printing ink. The resultant printing ink is printed on paper carrier which is suitable for the transfer printing process.

b. A cotton fabric is impregnated at room temperature with a liquor consisting of 200 parts of methoxypolyethylene glycol MG 430, 10 parts of copper acetate and 790 parts of water to a pick-up of about 70% and dried at 80° C to 100° C.

c. On an ironing machine, the Phthalogen Brillant Blue IFG3 is transferred from the paper carrier obtained according to a) over 30 seconds at 190° C to the cotton fabric which has been pretreated according to b). The transferred Phthalogen dye forms a blue complex with the copper. The dyeing is given its final brilliant shade by rinsing briefly with hot water and treating with 3 g of oxalic acid and 3 ml of formic acid (85%) per liter of water close to boiling temperature over 5 minutes. The fabric is finally rinsed and soaped with a 0.1% sodium carbonate solution close to boiling point. A deep, brilliant green or blue print of very good fastness to wet treatments, light and rubbing is obtained.

We claim:

1. In a transfer printing process for the dyeing or printing of hydrophilic fibrous material which comprises (A) bringing the surface of a hydrophilic fibrous material into contact with the treated surface of a carrier, said carrier sheet having been treated with a printing ink containing at least one transferable, metallizable dye or color former, (B) subjecting the carrier and hydrophilic fibrous material to heat treatment for a time and at a temperature sufficient to achieve transfer of the dye or color former to the hydrophilic fibrous material, (C) separating the hydrophilic fibrous material from the carrier sheet, and (D) subjecting the hydrophilic fibrous material to aftertreatment, the improvement according to which the hydrophilic fibrous material is, prior to contact with the carrier sheet, impregnated with an aqueous solution comprising
a. an organic solvent which
1. has a boiling point higher than 120° C
2. has a solubility in water of at least 25 g/l at 25° C directly or with the aid of an auxiliary solvent, and
3. is sparingly volatile but fluid under the heat treatment conditions of (B), and
b. at least one compound which yields a metal which forms a complex with the dye or color former of the printing ink, and
following impregnation, said hydrophilic fibrous material is dried at a temperature up to about 100° C.

2. A process according to claim 1 wherein the organic solvent contains at least one functional group selected from those consisting of hydroxy, alkoxy, epoxy, acyloxy, keto, mercapto, alkylthio, acylamino, ureido and amino.

3. A process according to claim 1, wherein the organic solvent contains at least two of the groups referred to in claim 2.

4. A process according to claim 1 wherein the organic solvent is of the formula

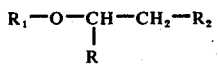

wherein R represents H or CH$_3$, R$_1$ represents H, alkyl with 1 to 4 carbon atoms, benyzl, phenylethyl,

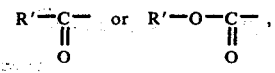

in which R' represents alkyl with 1 to 4 carbon atoms, cycloalkyl with 5 to 6 carbon atoms, benzyl, phenylethyl or phenyl, and R$_2$ represents OH, OR', —SR'—, —NHR', N,N-dialkylamino with 1 to 4 carbon atoms, N,N-dibenzylamino,

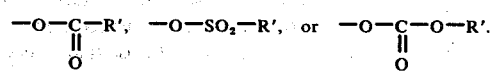

5. A process according to claim 1 wherein the organic solvent is one having one or more groups of the formula

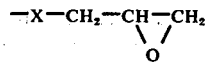

wherein —X— represents —O— or —N—.

6. A process according to claim 1 wherein the organic solvent is a urea or melamine the nitrogen atoms of which are substituted by low molecular alkyl, hydroxylalkyl or alkoxy groups.

7. A process according to claim 1 wherein the organic solvent is a compound of the formula

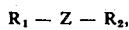

wherein Z represents an oxygen or a sulphur atom or a group

and each of R$_1$, R$_2$ and R$_3$ represents low molecular, optionally substituted alkyl radicals at least one of which is substituted by a hydroxy group.

8. A process according to claim 1 wherein the organic solvent is an ester of an aliphatic phosphoric acid or phosphoric triamide.

9. A process according to claim 1 wherein the compound that yields complex forming metals is a water soluble salt or compound of chromium, aluminum, cobalt, copper, magnesium, manganese, iron, molybdenum, nickel, tin, titanium, tungsten, zinc, zirconium or antimony.

10. A process according to claim 1, wherein the metallizable dye is a transferable metallizable azo dye.

11. A process according to claim 10 wherein the dye is a transferable o-aminozao or o-hydroxyazo dye which, during the metallization, forms structures of the type

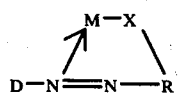

wherein D represents the radical of a diazotisation component, R represents the radical of a coupling component, M represents a metal equivalent and X is O or NH.

12. A process according to claim 10 wherein the dye is a transferable o-aminoazo or o-hydroxyazo dye which has one complex forming substituent in the o,o'-position on both sides of the azo group, and is of the formula

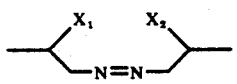

wherein each of $X_1$ and $X_2$ independently represents a group of the formula —OH, OR, $SR_3$, —$NH_2$—NHR and —COOH, in which R represents an alkyl radical.

13. A process according to claim 10 wherein the dye is a transferable metallizable azo dye which contains heterocyclic diazo components that participate in the complex fashion.

14. A process according to claim 13 wherein the dye is a transferable metallizable azo dye which contains the radicals of diazo components of the 8-aminoquinoline, 2-amino-pyridine, 2-aminothiazole and 2-aminothiadiazole series.

15. A process according to claim 1 wherein the metallizable dye is a transferable metallizable dye of the azomethine series.

16. A process according to claim 1 wherein the hydrophilic fibrous material is a textile material of cellulose.

* * * * *